Feb. 20, 1962 V. D. STROUD ET AL 3,022,504
TWO-WAY RADIO TELEPHONE SYSTEM UTILIZING FREQUENCY SUBBANDS TO PROVIDE TRANSMITTER-RECEIVER ISOLATION
Filed Nov. 18, 1960
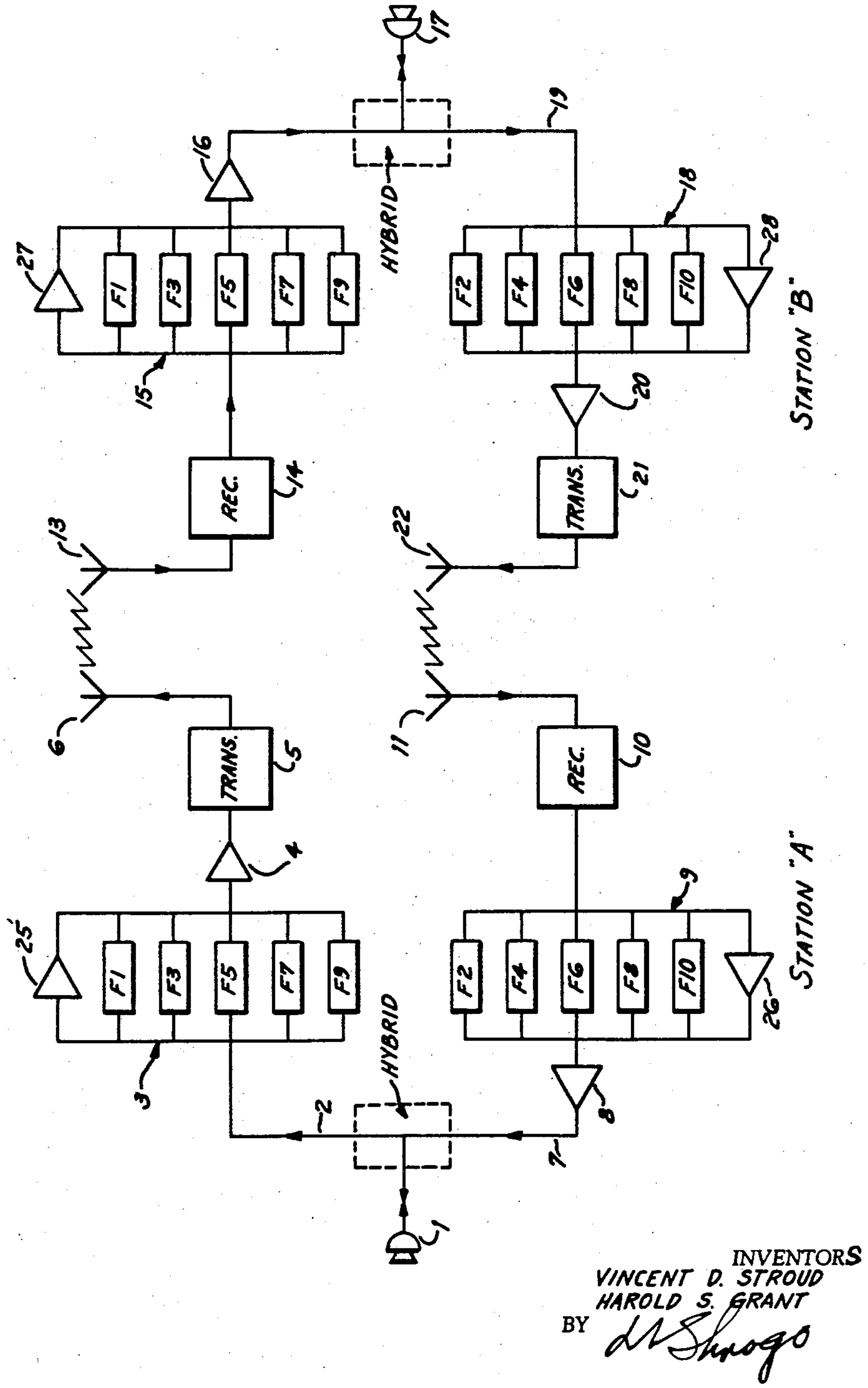
INVENTORS
VINCENT D. STROUD
HAROLD S. GRANT
BY United States Patent Office 3,022,504

Patented Feb. 20, 1962

3,022,504

TWO-WAY RADIO TELEPHONE SYSTEM UTILIZING FREQUENCY SUBBANDS TO PROVIDE TRANSMITTER-RECEIVER ISOLATION

Vincent D. Stroud, 3915 Weller Road, Wheaton, Md., and Harold S. Grant, 2414 Fairlawn St., Washington, D.C.

Filed Nov. 18, 1960, Ser. No. 70,292
5 Claims. (Cl. 343—178)

The present invention relates generally to communications systems and more particularly to a terminating network for providing signal isolation between the transmitting and receiving components of a radio telephone system connected to a standard commercial two-wire telephone line.

The terminating network employed in most radio telephone communication systems usually includes a mutual inductance bridge or a voice operated gain adjusting device (VOGAD). To achieve the required amount of isolation between the receiving radio path and the transmitting radio path, it is necessary to maintain a precise balance of the mutual inductance bridge. These adjustments, to minimize signal feedover, must be repeated every time a different telephone line is connected to the terminating network. The VOGAD system attempts to solve the problem by the use of voice operated switching relays to prevent feedback. This leaves much to be desired; however, since the relays being voice operated must often make a compromise when one party interrupts the other. What is worse, to add to the confusion, the interrupting party does not realize that he is not being heard. In addition, because of the sensitivity limitations imposed by the circuit parameters and speech characteristics, the first syllable of each word is frequently unheard or lost.

The problem is threefold: (*a*) Feedback is encountered in long distance two-way radio voice circuits when terminated on a two-wire standard telephone line at each end because of inadequate isolation between the receiving path and the transmitting path. Since it is necessary to run the radio paths at approximately unity gain, the system will be on the verge of oscillation if no effective isolation between the receiving and transmitting paths is maintained. (*b*) Insufficient isolation results in the noise being enhanced by the cumulative effect of feedback. This, in effect, increases the radio path noise which results in a very poor signal-to-noise ratio. (*c*) The nominal level established by one standard prior art system for a voice transmission at the receive side of a two-wire telephone line is −25 db. The high noise level brought about by the lack of isolation mentioned above frequently exceeds the nominal level present in this system. Further, modulating the radio transmitter with this low level voice signal (−25 db) results in an effective decrease of the signal-to-noise ratio at the distant receiver station.

It is accordingly a primary object of the present invention to provide a two-wire to four-wire terminating network for use in a radio telephone communication system.

Another object of the present invention is to provide a two-wire to four-wire radio telephone terminating unit which utilizes interleaved comb filters to divide the audio band between the transmitting and receiving circuits. Each link has a comb of (*n*) filters for its use spaced across the audio band. The second set of (*n*) filters is constructed to fit between the pass-bands of the first set.

A still further object of the present invention is to provide a radio telephone terminating network which, by itself or with complementary apparatus, improves the signal path isolation between the receiving and transmitting components of the system.

A yet still further object of the present invention is to provide a two-wire to four-wire terminating circuit for use in a radio telephone system which is at the same time relatively insensitive to changes in the telephone line characteristics, line length and the number of units used on any particular line.

Other objects and many of the attendant advantages of this invention will be readily appreciated as the same becomes better understood by reference to the following detailed description when considered in connection with the accompanying drawing, the single figure of which is a schematic diagram of a two-station system constructed in accordance with a preferred embodiment of the present invention.

Briefly and in general terms, the above objects of the invention are realized, according to the present invention, by utilizing interleaved comb filters to separate the signals in the audio portions of the system into two series of mutually exclusive but complementary subbands which together fill the complete audio spectrum. By means of this technique, the voice signals coupled, for example, to the radio transmitter from the subscriber's telephone at one station have missing therefrom a particular series of audio subbands, which subbands correspond to those which are coupled to the transmitter at the second station from the subscriber's telephone located thereat. Thus, in effect, mutually exclusive but complementary audio subbands modulate the transmitters at the two different stations. Although the signals supplied to the listener are incomplete and have missing therefrom certain frequency subbands, nevertheless, it has been found that such signals will convey intelligible speech with little or no change in the natural sound of the subscriber's voice as transmitted over a telephone line. Furthermore, by employing complementary subbands which fall completely within the audio spectrum, the bandwidth of the radio transmission system is kept within normal limits.

Referring now to the drawing, the single figure of which schematically illustrates a two-station radio telephone communication system utilizing the present invention in conjunction with a hybrid unit, the subscriber's telephone set 1 at station A is connected via a two-wire sending line, represented in simplified form by reference character 2, to a first bank of parallelly connected audio band-pass filters 3. These filters are in the input circuit of a conventional audio amplifier 4 which supplies the modulation signal for radio frequency transmitter 5 having a radiating antenna 6.

Telephone set 1 is also connected via a two-wire receiving line, represented in simplified form by reference character 7, to the output of an audio amplifier 8 which has in its input circuit a second bank of parallelly connected audio band-pass filters 9. These filters are supplied with signal energy from the audio output of radio frequency receiver 10 associated with detecting antenna 11.

Filters $F_1$, $F_3$, $F_5$, $F_7$ and $F_9$ of filter bank 3 in the transmitting portion of the system are tuned to different frequencies within the audio band. As an example, these frequencies could be spaced one from the other by twice the frequency spread of the band-pass filters. Thus, if all the above filters have a band-pass width of 200 cycles, filter $F_1$ may be tuned to 200 cycles, $F_3$, to 600 cycles, $F_5$, to 1,000 cycles, $F_7$, to 1,400 cycles and $F_9$, to 1,800 cycles. Likewise, filters $F_2$, $F_4$, $F_6$, $F_8$ and $F_{10}$ of filter bank 9, associated with the receiving part of the system, are tuned to different frequencies within the audio band, with the separation between adjacent frequencies again being twice the band-pass spread of these filters. However, these last-mentioned frequencies are midway between those to which the individual filters in band 3 are tuned. Thus, for example, if the receiving filters each have a band-pass width of 200 cycles, $F_2$ may be tuned to 400 cycles, $F_4$, to 800 cycles, $F_6$, to 1600 cycles and $F_{10}$, to 2000 cycles.

It would be pointed out at this time that the particular number of filters employed in each bank and the bandwidth and center frequency of each filter is purely a matter of design. Two specific requirements should be considered in the above design. One, the pass-band of all the filters stay within the limits of the audio spectrum which may be considered as extending from 200 to 3,000 cycles. Two, in order to preserve the naturalness of the voice transmission, it has been determined by experiments that the band-pass of the individual filters should not be equal and the center frequencies not equally spaced. The filters at the low frequency end of the audio spectrum should be designed with narrow band-pass and center frequencies closely spaced. As the frequency of the filters increases, the band-pass of the filters can be wider and the center frequencies can be spaced farther apart. It would also be mentioned that the various filters should be designed to provide from 50 db to 60 db attenuation at the filter characteristic crossover point between adjacent filters, such as $F_3$ in bank 3 and $F_4$ in bank 9.

It will be seen from an examination of the construction of station A that, when a subscriber speaks into telephone set 1, his voice signals will pass to the filter bank 3, and these filters will effectively sample the signal at a number of discrete frequency bands corresponding to the band-pass frequencies of the individual filters making up this array. These frequency components will thus pass without any appreciable attenuation to the input of audio amplifier 4, modulate radio transmitter 5 and be sent out to remote station B by antenna 6.

The modulator carrier wave radiated from antenna 6 when station A is sending is detected by antenna 13 at station B, and these RF signals are supplied to a conventional receiver 14 whose audio output feeds a bank of parallelly connected audio band-pass filters 15. These filters, it will be appreciated, are counterparts of those of bank 3 located in the transmitting line of station A, being tuned to the same band-pass characteristics. Consequently, these filters present little impedance to the incoming audio signals, and they pass via audio amplifier 16 to the subscriber's telephone set 17.

Station B also includes a transmitting bank of filters 18 which are counterparts of those located in the receiving line of station A, being tuned to the same frequencies and having the same band-pass characteristics. This bank of filters is energized with audio signals from telephone set 17 via two-wire sending line 19 and feeds audio amplifier 20 which provides the modulating signal for radio frequency transmitter 21 coupled to radiating antenna 22. From a comparison of station A and station B, it will be seen that the operating equipment located at each station is essentially the same, the only difference being in the location of the similar banks of filters in the transmitting and receiving lines.

The procedure, whereby a subscriber speaking into telephone set 17 at station B communicates with a party attending telephone set 1 at station A, is similar to that previously described. However, the voice signals now modulating transmitter 21 contain a different set of audio subbands, which subbands correspond to those deleted from the voice signal modulating transmitter 5 when station A is broadcasting to station B. Consequently, when the modulated carrier wave detected by antenna 11 is converted by radio receiver 10 to the audio portion of the spectrum, the resultant subbands match the band-pass characteristics of filters $F_2$, $F_4$, $F_6$, etc. Hence, these signals suffer little attenuation in the receiving line and pass via audio amplifier 8 and two-wire line 7 to the subscriber's telephone at this station.

In the above description, the telephone sets at each station were directly connected by two-wire lines, such as 2 and 7 of station A, to the transmitting filter bank 3 and the output of the audio amplifier 8, respectively. However, in order to provide a greater degree of signal isolation in the system, a hybrid transformer can be inserted at the junction formed by the above two lines and the common subscriber line.

It would also be pointed out that in the modification above described audio amplifiers were inserted in the transmitting lines before each of the transmitters 5 and 21. These amplifiers are present to permit the operator to adjust the line level to that required by the transmitter. Furthermore, in order to prevent complete dropout of the groups of frequencies between the filters in either the transmitting or receiving circuit, a frequency admittance level amplifier may be connected in parallel with each filter bank. These amplifiers 25, 26 of station A and 27, 28 of station B permit the isolation figure of the filter system to be controlled.

It would also be mentioned that instead of using a single telephone set at each station a multiplicity of such sets may be connected to the common subscriber line without unbalancing or otherwise disturbing the operation of the system.

Obviously many modifications and variations of the present invention are possible in the light of the above teachings. It is therefore to be understood that within the scope of the appended claims the invention may be practiced otherwise than as specifically described.

What is claimed is:

1. A two-station radio telephone communication system comprising, in combination, means at said first station for radiating a radio frequency carrier wave which is modulated with a locally generated subscriber's voice signal from which a first series of audio subbands have been suppressed, means at said second station for radiating a radio frequency carrier wave which is modulated with a locally generated subscriber's voice signal from which a second series of spaced audio subbands have been suppressed, the subbands of said first and second series occupying mutually exclusive but complementary portions of the complete audio frequency spectrum, and means at each station for detecting and converting the modulated radio frequency carrier wave radiated by the other station to an audio signal.

2. A two-station radio communication system comprising, in combination, means at said first station for radiating a radio frequency carrier wave which is modulated with a locally generated subscriber's voice signal from which a first series of audio subbands have been suppressed, means at said second station for radiating a radio frequency carrier wave which is modulated with a locally generated subscriber's voice signal from which a second series of spaced audio subbands have been suppressed, the audio subbands of said second series occurring at those portions of the audio spectrum which are not occupied by said first subbands, said first and second series of subbands substantially occupying the complete audio spectrum, and means at each station for detecting the modulated radio frequency carrier wave radiated by the other station and for converting it to an audio signal.

3. In a two-station radio telephone communication system, the combination of an "A" set of parallelly connected audio band-pass filters at each station, the band-passes of the various filters of each "A" set extending from $F_1$ to $F_2$ cycles, $F_3$ to $F_4$ cycles, $F_5$ to $F_6$ cycles, etc., a "B" set of parallelly connected audio pass-band filters at each station, the band-passes of the various filters of each "B" set extending from $F_2$ to $F_3$ cycles, $F_4$ to $F_5$ cycles, $F_6$ to $F_7$ cycles, etc., with the band-passes of the filters of both "A" and "B" sets substantially filling the audio spectrum, a telephone, a radio transmitter and a radio receiver at each station, means for connecting the telephone at each station to one side of an "A" set and a "B" set of filters, means for connecting the other side of one of the "A" sets of filters to a radio transmitter, means for connecting the other side of the other "A" set of filters to a radio receiver, means for connecting the other side of one of the "B" sets of filters to a radio transmitter, means for connecting the other side of the other set of "B" filters to a radio receiver whereby one of said stations radiates a carrier wave modulated by a voice signal from which a first series of audio subbands have been suppressed and the other station radiates a carrier wave modulated with a voice signal from which a second series of audio subbands have been suppressed.

4. In a two-station radio telephone communication system, the combination of a first group of parallelly connected audio pass-band filters located at said first station, the band-passes of the various filters of said group extending from $F_1$ to $F_2$ cycles, $F_3$ to $F_4$ cycles, $F_5$ to $F_6$ cycles, etc., a second group of parallelly connected audio band-pass filters, the band-passes of the various filters of said second group extending from $F_2$ to $F_3$ cycles, $F_4$ to $F_5$ cycles, $F_6$ to $F_7$ cycles, etc., with the band-passes of both groups substantially filling the complete audio spectrum, a telephone set located at said first station, means for connecting the voice signal generated by said telephone in response to the subscriber's use thereof to the input of said first group of filters, a first radio transmitter, a first radiating antenna, means for connecting the output of said first group of filters to said first radio frequency transmitter, thereby to modulate said first transmitter, means for connecting the output of said first transmitter to said first radiating antenna, a first detecting antenna, a first radio frequency receiver, means for connecting the output of said first detecting antenna to the input of said first radio frequency receiver, means for connecting the audio output of said first radio frequency receiver to the input of said second group of filters, and means for connecting the output of said second group of filters to said telephone set.

5. In an arrangement as defined in claim 4, a third group of parallelly connected audio band-pass filters located at said second station, the band-passes of the various filters of said third group extending from $F_1$ to $F_2$ cycles, $F_3$ to $F_4$ cycles, $F_5$ to $F_6$ cycles, etc., a fourth group of parallelly connected audio band-pass filters located at said second station, the band-passes of the various filters of said fourth group extending from $F_2$ to $F_3$ cycles, $F_4$ to $F_5$ cycles, $F_6$ to $F_7$ cycles, etc., with the band-passes of both the third and fourth groups of filters covering substantially the complete audio spectrum, a telephone set located at said second station, means for connecting the voice signal generated by said telephone in response to the subscriber's use thereof to the input of said fourth group of filters, a second radio frequency transmitter, a second radiating antenna, means for connecting the output of said fourth group of filters to said second radio frequency transmitter, means for connecting the output of said second radio frequency transmitter to said second radiating antenna, a second detecting antenna, a second radio frequency receiver, means for connecting the output of said second detecting antenna to the input of said second radio frequency receiver, means for coupling the audio output of said second radio receiver to the input of said third group of filters, and means for connecting the output of said third group of filters to the telephone set located at said second station.

No references cited.